United States Patent
Oh et al.

(10) Patent No.: US 8,609,559 B2
(45) Date of Patent: Dec. 17, 2013

(54) GLASS COMPOSITIONS, DIELECTRIC COMPOSITIONS AND MULTILAYER CERAMIC CAPACITOR HAVING HIGH CAPACITANCE USING THE SAME

(71) Applicant: Samhwa Capacitor Co., Ltd., Yongin-si (KR)

(72) Inventors: Young Joo Oh, Seoul (KR); Jung Rag Yoon, Yongin-si (KR)

(73) Assignee: Samhwa Capacitor Co., Ltd. (KR)

( * ) Notice: Subject to any disclaimer, the term of this patent is extended or adjusted under 35 U.S.C. 154(b) by 0 days.

(21) Appl. No.: 13/800,191

(22) Filed: Mar. 13, 2013

(65) Prior Publication Data
US 2013/0196159 A1 Aug. 1, 2013

Related U.S. Application Data

(62) Division of application No. 13/221,216, filed on Aug. 30, 2011, now Pat. No. 8,466,078.

(30) Foreign Application Priority Data

Sep. 3, 2010 (KR) .................. 10-2010-0086481

(51) Int. Cl.
C03C 8/04 (2006.01)
C03C 3/089 (2006.01)
C03C 3/093 (2006.01)

(52) U.S. Cl.
USPC .................. 501/26; 501/65; 501/67

(58) Field of Classification Search
USPC .................. 501/21, 26, 65, 67
See application file for complete search history.

(56) References Cited

U.S. PATENT DOCUMENTS

| 5,599,757 A | 2/1997 | Wilson et al. |
| 6,270,716 B1 | 8/2001 | Sugimoto |
| 8,270,144 B2 | 9/2012 | Sohn et al. |

*Primary Examiner* — Karl Group
(74) *Attorney, Agent, or Firm* — Cantor Colburn LLP

(57) ABSTRACT

Disclosed are a glass composition and a dielectric composition enabling low temperature sintering, and a high capacitance multilayer ceramic capacitor using the same. In the glass composition used for sintering, the glass composition may be formed of a formula, $aR_2O$-$bCaO$-$cZnO$-$dBaO$-$eB_2O_3$-$fAl_2O_3$-$gSiO_2$, and the formula may satisfy $a+b+c+d+e+f+g=100$, $0 \leq a \leq 7$, $1 \leq b \leq 3$, $1 \leq c \leq 15$, $10 \leq d \leq 20$, $3 \leq e \leq 10$, $0 \leq f \leq 3$, and $55 \leq g \leq 72$. Through this, when manufacturing the high capacity multilayer ceramic capacitor, the dielectric substance may enable the lower temperature sintering, thereby enhancing a capacitance and a reliability of the high capacitance multilayer ceramic capacitor.

5 Claims, 4 Drawing Sheets

FIG. 2

| Glass composition | Composition ratio of glass composition( Mol %) | | | | | | |
|---|---|---|---|---|---|---|---|
| | $R_2O$ | CaO | ZnO | BaO | $B_2O_3$ | $SiO_2$ | $Al_2O_3$ |
| Embodiment(A1) | 7 | 1 | 2 | 10 | 5 | 72 | 3 |
| Embodiment(A2) | 5 | 1 | 2 | 10 | 7 | 72 | 3 |
| Embodiment(A3) | 3 | 2 | 5 | 10 | 5 | 72 | 3 |
| Embodiment(A4) | 0 | 3 | 7 | 20 | 5 | 64 | 1 |
| Embodiment(A5) | 7 | 3 | 5 | 15 | 5 | 64 | 1 |
| Embodiment(A6) | 7 | 3 | 10 | 10 | 5 | 64 | 1 |
| Embodiment(A7) | 7 | 3 | 2 | 10 | 10 | 66 | 2 |
| Embodiment(A8) | 0 | 3 | 15 | 10 | 7 | 64 | 1 |
| Embodiment(A9) | 5 | 1 | 1 | 20 | 3 | 68 | 2 |
| Embodiment(A10) | 0 | 3 | 10 | 5 | 7 | 72 | 3 |
| Embodiment(A11) | 0 | 2 | 6 | 20 | 10 | 60 | 1 |
| Embodiment(A12) | 2 | 3 | 10 | 20 | 10 | 55 | 0 |
| Comparison example(A13) | 7 | 3 | 0 | 15 | 14 | 60 | 1 |
| Comparison example(A14) | 10 | 1 | 0 | 10 | 13 | 65 | 1 |
| Comparison example(A15) | 0 | 20 | 0 | 30 | 0 | 50 | 0 |

FIG. 3

| Class | Main component | Additives(Mol with respect to main component 100 mol) | | | | | | | | Glass powder | |
|---|---|---|---|---|---|---|---|---|---|---|---|
| | BaTiO$_3$ | MgO | Y$_2$O$_3$ | Dy$_2$O$_3$ | Er$_2$O$_3$ | Mn$_3$O$_4$ | GeO$_2$ | MoO$_3$ | SiO$_2$ | Embodiment & comparison example of glass composition | Content |
| Embodiment(B1) | 100 | 0.7 | 0.6 | | 0.3 | 0.03 | 0.1 | 0 | 0 | A11 | 2 |
| Embodiment(B2) | 100 | 1.5 | 0.3 | | 0.3 | 0.03 | 0.3 | 0 | 0 | A14 | 1 |
| Embodiment(B3) | 100 | 1.2 | 0 | 0.6 | 0 | 0.05 | 0.15 | 0.5 | 0.1 | A13 | 0.8 |
| Embodiment(B4) | 100 | 2 | 0 | 0.1 | 0.5 | 0.3 | 0.05 | 0.05 | 0 | A1 | 1.3 |
| Embodiment(B5) | 100 | 1 | 0 | 0.5 | 0.5 | 0.1 | 0.05 | 0.05 | 0 | A12 | 0.6 |
| Embodiment(B6) | 100 | 2 | 0.3 | 0.3 | 0 | 0.05 | 0.3 | 0.3 | 0 | A3 | 0.9 |
| Embodiment(B7) | 100 | 1 | 0 | 0.6 | 0 | 0.03 | 0.3 | 0.03 | 0.05 | A5 | 1.3 |
| Embodiment(B8) | 100 | 0.7 | 0 | 0 | 0.9 | 0.05 | 0.3 | 0.1 | 0 | A10 | 0.9 |
| Embodiment(B9) | 100 | 1.2 | 0.4 | 0.2 | 0 | 0.2 | 0.05 | 0.05 | 0 | A3 | 1 |
| Embodiment(B10) | 100 | 1 | 0.2 | 0 | 0.6 | 0.05 | 0.1 | 0.3 | 0 | A2 | 1.5 |
| Embodiment(B11) | 100 | 1.5 | 0 | 0.9 | 0 | 0.03 | 0.5 | 0.1 | 0 | A9 | 0.6 |
| Embodiment(B12) | 100 | 0.8 | 0.2 | 0 | 0.8 | 0.05 | 0.5 | 0.3 | 0 | A4 | 1.5 |
| Embodiment(B13) | 100 | 0.8 | 0 | 0.6 | 0.2 | 0.03 | 0.15 | 0.05 | 0 | A5 | 0.8 |
| Embodiment(B14) | 100 | 0.7 | 0 | 0.2 | 0.6 | 0.3 | 0.01 | 0.03 | 0 | A8 | 1.5 |
| Embodiment(B15) | 100 | 0.8 | 0 | 0.6 | 0 | 0.05 | 0.5 | 0.03 | 0 | A11 | 1.2 |
| Embodiment(B16) | 100 | 1 | 0 | 0.3 | 0.3 | 0.15 | 0.15 | 0.35 | 0 | A12 | 0.9 |
| Embodiment(B17) | 100 | 2 | 0.6 | 0 | 0.2 | 0.05 | 0.5 | 0.1 | 0 | A3 | 1.2 |
| Embodiment(B18) | 100 | 1.5 | 0 | 1 | 0.5 | 0.03 | 0.15 | 0.03 | 0.05 | A11 | 0.5 |
| Embodiment(B19) | 100 | 0.8 | 0 | 0.6 | 0.4 | 0.05 | 0.5 | 0.5 | 0 | A4 | 0.6 |
| Embodiment(B20) | 100 | 0.7 | 0.2 | 0.6 | 0 | 0.07 | 0.3 | 0.55 | 0.1 | A4 | 1.2 |
| Embodiment(B21) | 100 | 1 | 0.2 | 0 | 0.6 | 0.05 | 0.1 | 0.3 | 0 | A3 | 0.6 |
| Embodiment(B22) | 100 | 1.5 | 0 | 0.9 | 0 | 0.03 | 0.5 | 0.1 | 0 | A13 | 1.3 |
| Embodiment(B23) | 100 | 0.8 | 0 | 0 | 1 | 0.05 | 0.5 | 0.3 | 0 | A11 | 0.6 |
| Embodiment(B24) | 100 | 0.8 | 0 | 0.6 | 0.4 | 0.03 | 0.15 | 0.05 | 0 | A7 | 0.6 |
| Embodiment(B25) | 100 | 0.7 | 0 | 0.2 | 0.4 | 0.3 | 0.01 | 0.03 | 0 | A6 | 1 |
| Embodiment(B26) | 100 | 0.8 | 0 | 0.6 | 0.2 | 0.05 | 0.5 | 0.03 | 0 | A9 | 1.5 |
| Embodiment(B27) | 100 | 1 | 0 | 0.3 | 0.3 | 0.15 | 0.15 | 0.35 | 0 | A8 | 1.3 |
| Embodiment(B28) | 100 | 2 | 0.6 | 0 | 0.2 | 0.05 | 0.5 | 0.1 | 0 | A2 | 0.8 |
| Embodiment(B29) | 100 | 1.5 | 0 | 0.5 | 0.5 | 0.025 | 0.15 | 0.03 | 0.05 | A1 | 0.6 |
| Embodiment(B30) | 100 | 1.5 | 0.5 | 0 | 0.3 | 0.03 | 0.3 | 0 | 0 | A11 | 0.5 |
| Comparison example(B31) | 100 | 1.3 | 0.6 | 0.1 | 0 | 0.04 | 0 | 0 | 0 | A15 | 1.2 |
| Comparison example(B32) | 100 | 1 | 0 | 0.6 | 0 | 0.25 | 0 | 0 | 0 | A15 | 1 |
| Comparison example(B33) | 100 | 0.5 | 0.3 | 0 | 0.3 | 0.3 | 0 | 0 | 0 | A15 | 1.5 |
| Comparison example(B34) | 100 | 2 | 0 | 0.3 | 0.3 | 0.06 | 0 | 0 | 1 | A15 | 0.5 |
| Comparison example(B35) | 100 | 1.5 | 0 | 0 | 0.6 | 0.1 | 0 | 0 | 0.5 | A15 | 1.2 |
| Comparison example(B36) | 100 | 2 | 0.9 | 0 | 0 | 0.05 | 0 | 0 | 1.5 | A15 | 0.3 |

FIG. 4

| Class | Permittivity | Dielectric loss(%) | Insulation resistance (R*C, 25°C) | Insulation resistance (R*C, 150°C) | Capacitance /Temperature coefficient (85 °C) | Sintering temperature (°C) | Note |
|---|---|---|---|---|---|---|---|
| Embodiment(C1) | 2060 | 0.65 | 1520 | 1200 | -1.8 | 1080 | Low temperature sintering possible (less than 1050°C) |
| Embodiment(C2) | 2820 | 3.5 | 935 | 400 | -2.6 | 1150 | |
| Embodiment(C3) | 2260 | 0.45 | 1555 | 1340 | -3.5 | 1120 | |
| Embodiment(C4) | 2450 | 0.5 | 1690 | 1050 | -2.9 | 1150 | |
| Embodiment(C5) | 2690 | 3.5 | 890 | 590 | -1.8 | 1150 | |
| Embodiment(C6) | 2190 | 0.65 | 1450 | 980 | -0.8 | 1120 | |
| Embodiment(C7) | 2300 | 0.45 | 1290 | 1010 | -3.5 | 1150 | |
| Embodiment(C8) | 2560 | 1.03 | 1080 | 690 | -0.38 | 1150 | |
| Embodiment(C9) | 2300 | 1 | 898 | 358 | -1.8 | 1150 | |
| Embodiment(C10) | 2450 | 4 | 1790 | 1090 | -0.8 | 1120 | |
| Embodiment(C11) | 2260 | 0.45 | 1350 | 980 | -3.5 | 1150 | |
| Embodiment(C12) | 2650 | 0.9 | 1256 | 998 | -2.6 | 1150 | |
| Embodiment(C13) | 2590 | 0.82 | 1670 | 1023 | -1.8 | 1150 | |
| Embodiment(C14) | 2650 | 1.5 | 1050 | 905 | -3.5 | 1150 | |
| Embodiment(C15) | 2450 | 0.5 | 1459 | 945 | -2.9 | 1050 | |
| Embodiment(C16) | 2340 | 1.56 | 780 | 345 | -3.1 | 1150 | |
| Embodiment(C17) | 2060 | 2.9 | 960 | 558 | -1.8 | 1150 | |
| Embodiment(C18) | 2234 | 1.03 | 880 | 659 | -0.8 | 1150 | |
| Embodiment(C19) | 2380 | 0.45 | 1078 | 980 | -1.8 | 1120 | |
| Embodiment(C20) | 2690 | 0.82 | 1450 | 1020 | -0.1 | 1150 | |
| Embodiment(C21) | 2348 | 3 | 1012 | 800 | -2.6 | 1150 | |
| Embodiment(C22) | 2230 | 0.82 | 1906 | 1345 | -3.1 | 1150 | |
| Embodiment(C23) | 2450 | 2.8 | 1205 | 990 | -2.9 | 1150 | |
| Embodiment(C24) | 2790 | 3.5 | 970 | 560 | -0.09 | 1120 | |
| Embodiment(C25) | 2780 | 4.2 | 905 | 470 | -3.1 | 1150 | |
| Embodiment(C26) | 2460 | 0.82 | 1450 | 950 | -0.8 | 1120 | |
| Embodiment(C27) | 2200 | 0.5 | 1679 | 1290 | -1.8 | 1120 | |
| Embodiment(C28) | 1980 | 0.35 | 1845 | 1090 | -2.6 | 1080 | |
| Embodiment(C29) | 2090 | 0.68 | 1050 | 670 | -3.1 | 1150 | |
| Embodiment(C30) | 2210 | 0.5 | 1905 | 1290 | -2.9 | 1150 | |
| Comparison example(C31) | 2850 | 1.8 | 351 | 20 | -1.9 | 1220 | High temperature sintering |
| | 1200 | 24 | 3 | 1 | -0.3 | 1150 | Degradation of electrical characteristic |
| Comparison example(C32) | 3200 | 0.8 | 1200 | 510 | -3.4 | 1250 | High temperature sintering |
| | 1150 | 28 | 3 | 1 | -4 | 1150 | Degradation of electrical characteristic |
| Comparison example(C33) | 3410 | 1.6 | 1250 | 30 | -3.4 | 1220 | Degradation of high temperature insulation |
| | 1690 | 5.9 | 450 | 120 | -0.9 | 1150 | Degradation of electrical characteristic |
| Comparison example(C34) | 2500 | 0.8 | 890 | 500 | -4.5 | 1220 | High temperature sintering |
| | - | - | - | - | - | 1150 | Non-sintering |
| Comparison example(C35) | 2769 | 1.6 | 1500 | 800 | -2.8 | 1220 | High temperature sintering |
| | 1560 | 2.8 | 190 | 130 | -0.3 | 1150 | Degradation of electrical characteristic |
| Comparison example(C36) | 2200 | 0.6 | 1280 | 890 | -1.2 | 1220 | High temperature sintering |
| | - | - | - | - | - | 1150 | Non-sintering |

GLASS COMPOSITIONS, DIELECTRIC COMPOSITIONS AND MULTILAYER CERAMIC CAPACITOR HAVING HIGH CAPACITANCE USING THE SAME

CROSS-REFERENCE TO RELATED APPLICATION

This application is a divisional of U.S. patent application Ser. No. 13/221,216, filed Aug. 30, 2011 which claims priority to and the benefit of Korean Patent Application No. 10-2010-0086481, filed on Sep. 3, 2010, with the Korean Patent Office, the entire contents of which are incorporated hereinto by reference.

BACKGROUND OF THE INVENTION

1. Field of the Invention

The present invention relates to a glass composition, a dielectric composition, and a high capacitance multilayer ceramic capacitor using the same, and more particularly, to a glass composition and a dielectric composition enabling low temperature sintering, and a high capacitance multilayer ceramic capacitor using the same.

2. Description of the Related Art

Miniaturization and super high capacitance have been applied to a multilayer ceramic capacitor (MLCC). For the super high capacitance of the MLCC, at least 500 layers of $BaTiO_3$ dielectric layers need to be multilayered. To obtain a smaller super high capacitance characteristic, a dielectric substance suitable for an ultra thin layer of a high capacitance needs to be secured. To configure the MLCC using the dielectric substance of the ultra thin layer, the dielectric substance enabling low temperature sintering is required.

Main materials of the dielectric substance may include $BaTiO_3$, $(BaCa)(ZrTi)O_3$, and the like. An additive or a glass composition has been used for a sintering compound of the dielectric substance. The glass composition for the MLCC is produced in a form of a glass powder through melting, quenching, and milling processes after mixing $BaO(BaCO_3)$, $CaO$, $B_2O_3(H_3BO_3)$, and $SiO_2$. The MLCC is manufacturing by producing a dielectric composition using such produced glass composition as the sintering compound, by preparing the ultra thin layer of the dielectric layer using the dielectric composition, by printing an internal electrode on the dielectric layer, and then performing compression, cutting, and baking processes.

For ultra thinness of the dielectric layer and an internal electrode layer during a manufacturing process of the MLCC having the high capacitance, the conventional MLCC grinds the glass composition using a milling method and prepares the glass composition as a powder. When preparing the glass composition using the milling method, the surface of particles of the glass composition may be rough and uneven. When manufacturing the MLCC by producing the dielectric composition using such glass composition and by forming the dielectric composition as an ultra thin layer, the capacitance of the MLCC may be degraded due to the uneven distribution of the dielectric layer. Also, when a baking temperature is high in high temperature baking, an un-matching sintering contraction between the dielectric layer and the internal electrode and a clog phenomenon of the internal electrode may be degraded whereby a short ratio may increase. Accordingly, the reliability of the MLCC may be degraded.

SUMMARY OF THE INVENTION

The present invention provides a glass composition having a particle with a uniform surface through thermal plasma processing.

The present invention also provides a glass composition including a spherical nano glass powder through thermal plasma processing.

The present invention also provides a dielectric composition enabling low temperature sintering using a spherical nano glass composition having a particle with a uniform surface.

The present invention also provides a multilayer ceramic capacitor having a high capacitance that may enhance a coverage characteristic of an internal electrode using a dielectric composition enabling low temperature sintering.

The present invention also provides a dielectric composition and a multilayer ceramic capacitor having a high capacitance that may enhance a reliability of an operation by enhancing a coverage characteristic of an internal electrode.

According to an aspect of the present invention, there is provided a glass composition used for sintering, wherein the glass composition is formed of a formula, $aR_2O$-$bCaO$-$cZnO$-$dBaO$-$eB_2O_3$-$fAl_2O_3$-$gSiO_2$, and the formula satisfies $a+b+c+d+e+f+g=100$, $0 \leq a \leq 7$, $1 \leq b \leq 3$, $1 \leq c \leq 15$, $10 \leq d \leq 20$, $3 \leq e \leq 10$, $0 \leq f \leq 3$, and $55 \leq g \leq 72$.

The glass composition may correspond to a spherical nano powder having an average grain size of 30 nm to 200 nm The spherical nano powder may be spheroidized or be vaporized by performing thermal plasma processing of a glass powder having a size of 0.2 μm to 30 μm. A temperature of the thermal plasma process may be 3000° C. to 8000° C. A radio frequency (RF) plasma torch may be used for the thermal plasma processing.

According to an aspect of the present invention, there is provided a dielectric composition including: barium titanate ($BaTiO_3$); an additive; and a glass composition according to the present invention. The glass composition 0.3 to 1.5 mol may be included with respect to $BaTiO_3$ 100, and the additive 0.71 to 6.3 mol may be included with respect to $BaTiO_3$ 100 mol.

The additive may use at least two selected from a group consisting of $MgO$, $Y_2O_3$, $Dy_2O_3$, $Er_2O_3$, $Mn_3O_4$, $GeO_2$, $MoO_3$, and $SiO_2$. In the additive, $MgO$ 0.7 to 2 mol may be included with respect to $BaTiO_3$ 100 mol, $Y_2O_3$ 0 to 0.6 mol may be included with respect to $BaTiO_3$ 100 mol, $Dy_2O_3$ 0 to 0.6 mol may be included with respect to $BaTiO_3$ 100 mol, $Er_2O_3$ 0 to 1 mol may be included with respect to $BaTiO_3$ 100 mol, $Mn_3O_4$ 0 to 1 mol may be included with respect to $BaTiO_3$ 100 mol, $GeO_2$ 0.01 to 0.5 mol may be included with respect to $BaTiO_3$ 100 mol, $MoO_3$ 0 to 0.55 mol may be included with respect to $BaTiO_3$ 100 mol, and $SiO_2$ 0 to 0.05 mol may be included with respect to $BaTiO_3$ 100 mol.

According to still another aspect of the present invention, there is provided a multilayer ceramic capacitor having a high capacitance, including: a plurality of dielectric layers including a dielectric composition according to the present invention; an internal electrode formed between the electric layers; and an external electrode electrically connected to the internal electrode.

The dielectric composition of the dielectric substance may have an average particle size of 30 mm to 150 mm, and a specific surface area thereof may be 3 g/m² to 30 g/m². A thickness of the dielectric layer may be 0.3 μm to 2 μm. The internal electrode may use Ni or Cu. The external electrode may uses Cu or Ag.

BRIEF DESCRIPTION OF THE DRAWINGS

The above and/or other aspects of the present invention will become apparent and more readily appreciated from the following description of the exemplary embodiments, taken in conjunction with the accompanying drawings in which:

FIG. 2 is a table illustrating a composition ratio of a glass composition according to an embodiment of the present invention;

FIG. 3 is a table illustrating a composition ratio of a dielectric composition according to an embodiment of the present invention; and FIG. 4 is a table illustrating a characteristic of a high capacitance multilayer ceramic capacitor according to the composition ratio of the dielectric substance of FIG. 3.

DETAILED DESCRIPTION OF THE INVENTION

Figure 1:
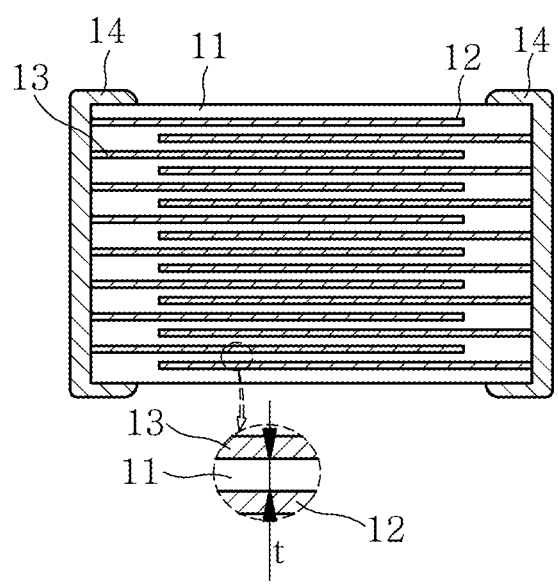
FIG. 1 is a sectional view of a high capacitance multilayer ceramic capacitor according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a glass composition, a dielectric composition, and a high capacitance multilayer ceramic capacitor using the same will be described in detail below.

A glass composition according to the present invention may be used for sintering when manufacturing a dielectric composition, and may be formed of a formula, $aR_2O$-$bCaO$-$cZnO$-$dBaO$-$eB_2O_3$-$fAl_2O_3$-$gSiO_2$. The formula may satisfy $a+b+c+d+e+f+g=100$, $0 \leq a \leq 7$, $1 \leq 3$, $1 \leq c \leq 15$, $10 \leq d \leq 20$, $3 \leq e \leq 10$, $0 \leq f \leq 3$, and $55 \leq g \leq 72$.

The glass composition may correspond to a spherical body having an average grain size of 30 nm to 200 nm. The spherical body may be spheroidized or be vaporized by performing thermal plasma processing of a glass powder having a size of 0.2 μm to 30 μm, and thereby be prepared as crystalline particles. The thermal plasma processing may be performed in an ultra high temperature of 3000° C. to 8000° C. A radio frequency (RF) plasma torch may be used for the thermal plasma processing.

The glass composition of the present invention used as a sintering compound of the dielectric composition may be used as the sintering compound of the dielectric composition by grinding a glass material including $aR_2O$-$bCaO$-$cZnO$-$dBaO$-$eB_2O_3$-$fAl_2O_3$-$gSiO_2$ and by performing thermal plasma processing and then distributing the same.

The glass composition of the present invention may be borosilicate. Alkaline oxide ($R_2O$) included in the glass composition functions to disconnect a glass network structure including $SiO_2$ and $B_2O_3$, thereby decreasing a melting point of glass and enhancing a high temperate liquidity. Content of alkaline oxide ($R_2O$) is 0 to 7 mol %. When the content exceeds 7 mol %, the glass network structure may be collapsed whereby a chemical durability of glass may be degraded.

CaO may be a network modifying oxide to decrease the melting point of glass and to reinforce the structure of glass weakened by the alkaline oxide. The content of CaO, 1 to 3 mol %, may be included in the glass composition.

The content of ZnO, 1 to 15 mol % may be included in the glass composition.

BaO may correspond to a component of most significantly degrading the melting point of glass among oxides of alkaline earths and may ease a change in a high temperature viscosity of glass and thereby prevent a sudden sintering contraction of ceramic. The content of BaO, 10 to 20 mol %, may be included in the glass composition.

$B_2O_3$ corresponds to a glass network former and may determine a solubility of the dielectric composition like $SiO_2$. $B_2O_3$ may decrease the melting point of the glass composition and enhance the high temperature liquidity. The content of $B_2O_3$ may be 3 to 10 mol %. When the content thereof is greater than or equal to 10 mol %, the chemical durability may be degraded due to a weakened structure of glass. It becomes difficult to form stable glass.

The content of $Al_2O_3$, 0 to 3 mol % may be included in the glass composition.

$SiO_2$ corresponds to a glass network former and may be the most important factor to determine the high temperature liquidity of glass, the melting point thereof, and a solubility of a ceramic dielectric substance. $SiO_2$ content included in the borosilicate glass composition may be 55 to 72 mol %. When the content is less than 55 mol %, the solubility of the ceramic dielectric substance may decrease. On the contrary, when the content exceeds 72 mol %, the high temperature liquidity may decrease and the melting point may increase. Accordingly, low temperature sintering of the ceramic dielectric substance may become difficult.

The dielectric composition according to the present invention may include barium titanate ($BaTiO_3$), an additive, and a glass composition.

The glass composition 0.3 to 1.5 mol may be included with respect to $BaTiO_3$ 100, and the additive 0.71 to 6.3 mol may be included with respect to $BaTiO_3$ 100 mol. The aforementioned glass composition for sintering according to the present invention may be used for the glass composition. The additive may use at least two of MgO, $Y_2O_3$, $Dy_2O_3$, $Er_2O_3$, $Mn_3O_4$, $GeO_2$, $MoO_3$, and $SiO_2$.

The glass composition according to the present invention may correspond to a borosilicate glass composition and may decrease a sintering temperature of a dielectric layer 11 of FIG. 1. In addition, since the glass composition includes an ultra fine body, the dispersibility may be maximized. Since the sintering temperature of the dielectric layer 11 may decrease to be less than or equal to 1150° C., un-matching sintering contraction between the dielectric layer 11 and internal electrodes 12 and 13 may decrease. A short ratio may decrease by minimizing a clog phenomenon of the internal electrodes 12 and 13. Accordingly, it is possible to secure a high capacitance of the dielectric layer 11.

In the case of content of the additive, MgO 0.7 to 2 mol is included with respect to $BaTiO_3$ 100 mol, and $Y_2O_3$ 0 to 0.6 mol is included with respect to $BaTiO_3$ 100 mol. $Dy_2O_3$ 0 to 0.6 mol is included with respect to $BaTiO_3$ 100 mol. $Er_2O_3$ 0 to 1 mol is included with respect to $BaTiO_3$ 100 mol. $Mn_3O_4$ 0 to 1 mol is included with respect to $BaTiO_3$ 100 mol. $GeO_2$ 0.01 to 0.5 mol is included with respect to $BaTiO_3$ 100 mol. $MoO_3$ 0 to 0.55 mol is included with respect to $BaTiO_3$ 100 mol, and $SiO_2$ 0 to 0.05 mol is included with respect to $BaTiO_3$ 100 mol.

Among the additive MgO, $Y_2O_3$, $Dy_2O_3$, $Er_2O_3$, $Mn_3O_4$, $GeO_2$, $MoO_3$, and $SiO_2$, particularly, rare-earth oxides $Y_2O_3$ and $Dy_2O_3$ are employed for particle surface of BaTiO3 to form a core shell and to enhance a high temperature insulation resistance and temperature characteristic of the dielectric composition. The dielectric composition has an average particle size $D_{50}$ of 30 mm to 150 mm, and has a specific surface area of 3 g/m² to 30 g/m². As described above, the average particle size of the dielectric composition is small and thus, the thickness of the dielectric layer 11 of FIG. 1 may be configured as an ultra thin layer.

As shown in FIG. 1, a high capacitance multilayer ceramic capacitor of the present invention may include a plurality of dielectric layers 11, the internal electrodes 12 and 13, and an external electrode 14.

The plurality of dielectric layers 11 includes the dielectric composition according to the present invention. The dielectric composition having the average particle size $D_{50}$ of 30 mm to 150 mm, and having a specific surface area of 3 g/m$^2$ to 30 g/m$^2$ is used. Therefore, the dielectric layer 11 may be formed to have a thickness t of 0.3 μm to 2 μm as an ultra thin layer. Since the dielectric layer 11 includes the dielectric composition according to the present invention, low temperature sintering less than or equal to 1150° C. is enabled. In addition, it is possible to enhance the reliability of the high capacitance multilayer ceramic capacitor of the present invention by decreasing the un-matching sintering contraction between the dielectric layer 11 and the internal electrodes 12 and 13, and by minimizing the clog-phenomenon of the internal electrodes 12 and 13.

Hereinafter, the present invention will be further described using embodiments and comparison examples of the present invention.

<Embodiments and Comparison Examples of Producing Glass Composition>

Embodiments of producing a glass composition of the present invention are shown in FIG. 2. Embodiments A1 to A12 and comparison examples A13 to A15 of production method of the glass composition of FIG. 2 initially mixed elements of FIG. 2 and melted the same in the temperature of 1200° C. to 1600° C. Next, a glass flake was prepared by quickly cooling the mixture and a glass powder was prepared by grinding the glass flake using a dry scheme. The grinded glass powder was prepared as a spherical body, that is, a spherical crystalline spherical nano powder having the average particle size of 30 nm to 200 nm through thermal plasma processing. The thermal plasma processing was performed in the ultra high temperature of 3000° C. to 8000° C. A radio frequency (RF) plasma torch was used. The diameter of glass powder placed for the thermal plasma processing was 0.2 μm to 30 μm, and a spherical nano glass composition having the average particle size of 30 nm to 200 nm was prepared simultaneously using a spheroidization and a vaporization.

<Embodiments and Comparison Examples of Producing Dielectric Composition>

Embodiments of producing a dielectric composition of the present invention are shown in FIG. 3. The dielectric compositions prepared embodiments B1 to B30 and comparison examples B31 to B36 of the dielectric compositions as shown in FIG. 3 by mixing barium titanate (BaTiO$_3$), main component, and the additive and the aforementioned embodiments A1 to A12 and comparison examples A13 to A15 of the present invention, respectively.

<Manufacture of High Capacitance Multilayer Ceramic Capacitor>

The manufacturing embodiment of the high capacitance multilayer ceramic capacitor of the present invention manufactured the dielectric layer 11 of FIG. 1 using the dielectric compositions that were produced according to the embodiments B1 to B30 and the comparison examples B31 to B36 of FIG. 3. Initially, a slurry was prepared by mixing and dispersing the dielectric compositions, produced according to the embodiments B1 to B30 and the comparison examples B31 to B36, with an organic solve and then mixing an organic binder. The dielectric layer 11 was formed using the slurry.

When the dielectric layer 11 was formed, the internal electrodes 12 and 13 were printed using Ni or Cu. When the internal electrodes 12 and 13 were printed, the dielectric layer 11 was layered on each of the internal electrodes 12 and 13. When the layering operation was completed, the layered body was cut and then was sintered in the temperature of 1050° C. to 1220° C. using a furnace. When the sintering was completed, the external electrode 14 was sprayed using Cu or Ag. Through this, embodiments C1 to C30 and comparison examples C31 to C36 of the high capacitance multilayer ceramic capacitor of the present invention were manufactured.

<Test Examples>

Characteristics of the high capacitance multilayer ceramic capacitor of the present invention manufactured according to the embodiments C1 to C30 and the comparison examples C31 to C36 of FIG. 4 were measured.

As shown in FIG. 4, the low temperature sintered high capacitance multilayer ceramic capacitors in the temperature of 1050° C. to 1150° C. according to the embodiments C1 to C30 of the present invention satisfied an electrical characteristic, for example, a dielectric permittivity, a dielectric loss, an insulation resistance, a capacitance temperature coefficient, and the like. On the other hand, in the comparison examples C31 to C36, the electrical characteristic was verified to not be satisfied in low temperature sintering.

As described above, the glass composition of the present invention may be formed so that the surface of the glass composition may be uniform and have a spherical shape through thermal plasma processing. Also, when producing the glass composition of the present invention and manufacturing the high capacitance multilayer ceramic capacitor using the glass composition, low temperature sintering is enabled. Accordingly, it is possible to enhance a coverage characteristic of an internal electrode and to maximize a capacitance. Since the electrical characteristic is enhanced, it is possible to manufacture a highly reliable multilayer ceramic capacitor having a high capacitance.

What is claimed is:

1. A glass composition used for sintering, wherein the glass composition is formed of a formula, $aR_2O$-$bCaO$-$cZnO$-$dBaO$-$eB_2O_3$-$fAl_2O_3$-$gSiO_2$, and the formula satisfies $a+b+c+d+e+f+g=100$ mol %, $0\leq a\leq 7$ mol %, $1\leq b\leq 3$ mol %, $1\leq c\leq 15$ mol %, $10\leq d\leq 20$ mol %, $3\leq e\leq 10$, $0\leq f\leq 3$ mol %, and $55\leq g\leq 72$ mol %.

2. The glass composition of claim 1, wherein the glass composition is in a form of a spherical nano powder having an average grain size of 30 nm to 200 nm.

3. The glass composition of claim 2, wherein the spherical nano powder is spheroidized or vaporized by performing thermal plasma processing of a glass powder having a size of 0.2 μm to 30 μm.

4. The glass composition of claim 3, wherein a temperature of the thermal plasma processing is 3000° C. to 8000° C.

5. The glass composition of claim 4, wherein a radio frequency (RF) plasma torch is used for the thermal plasma processing.

* * * * *